(12) United States Patent
De Samber et al.

(10) Patent No.: US 12,072,301 B2
(45) Date of Patent: Aug. 27, 2024

(54) INSPECTION SYSTEM FOR INSPECTING A LIGHTING DEVICE DURING AN ASSEMBLY PROCESS OF THE LIGHTING DEVICE AND A METHOD THEREOF

(71) Applicant: SIGNIFY HOLDING B.V., Eindhoven (NL)

(72) Inventors: Marc Andre De Samber, Lommel (BE); Philip Steven Newton, Waalre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 194 days.

(21) Appl. No.: 17/800,325

(22) PCT Filed: Feb. 15, 2021

(86) PCT No.: PCT/EP2021/053582
§ 371 (c)(1),
(2) Date: Aug. 17, 2022

(87) PCT Pub. No.: WO2021/165175
PCT Pub. Date: Aug. 26, 2021

(65) Prior Publication Data
US 2023/0063672 A1    Mar. 2, 2023

(30) Foreign Application Priority Data
Feb. 20, 2020   (EP) .................................... 20158494

(51) Int. Cl.
*G01N 21/956*   (2006.01)
(52) U.S. Cl.
CPC ................. *G01N 21/956* (2013.01)

(58) Field of Classification Search
CPC .......................... G01N 21/956; G01N 21/8851
See application file for complete search history.

(56) References Cited

U.S. PATENT DOCUMENTS 6,501,545 B2 * 12/2002 Komuro ................. H01L 22/26
257/E21.53
11,060,985 B2 * 7/2021 Mitaka ................. G01N 21/956
(Continued)

FOREIGN PATENT DOCUMENTS

WO    2019011678 A1    1/2019

*Primary Examiner* — Hung V Nguyen

(57) ABSTRACT

An inspection system (100) for inspecting a lighting device (150) during an assembly process of the lighting device; wherein the lighting device comprises a base plate (153) and a plurality of components (155) mounted on the base plate; wherein the inspection system comprises: a light source (120) arranged for illuminating the lighting device according to a first light output spectrum for providing a luminance contrast between the base plate and the plurality of components; an imaging unit/camera (130) arranged for capturing a first image of the illuminated lighting device; a controller (110) comprising a processing unit for determining a luminance contrast measure of the captured first image; wherein the processing unit is further arranged for, when the luminance contrast measure of the captured first image exceeds a threshold value, adapting the first light output spectrum, and wherein the imaging unit is further arranged for capturing a second image of the lighting device illuminated according to the adapted first light output spectrum; and wherein the controller further comprises: a comparing unit arranged for comparing the second image with a reference image; a determination unit arranged for determining a defect in the base plate and/or in the plurality of components based on the comparison.

15 Claims, 4 Drawing Sheets

(56) References Cited

U.S. PATENT DOCUMENTS

2004/0184031 A1 9/2004 Vook et al.
2014/0372075 A1 12/2014 Kojima et al.

* cited by examiner

INSPECTION SYSTEM FOR INSPECTING A LIGHTING DEVICE DURING AN ASSEMBLY PROCESS OF THE LIGHTING DEVICE AND A METHOD THEREOF

CROSS-REFERENCE TO PRIOR APPLICATIONS

This application is the U.S. National Phase application under 35 U.S.C. § 371 of International Application No. PCT/EP2021/053582, filed on Feb. 15, 2021, which claims the benefit of European Patent Application No. 20158494.3, filed on Feb. 20, 2020. These applications are hereby incorporated by reference herein.

FIELD OF THE INVENTION

The invention relates to an inspection system for inspecting a lighting device during an assembly process of the lighting device. The invention further relates to a method and a computer program product for inspecting a lighting device during an assembly process of the lighting device.

BACKGROUND

A LED (Light Emitting Diode) is a solid semiconductor device that can convert electric energy into visible light. The LED becomes an ideal light source that takes the place of conventional light sources due to advantages of small volume, low power consumption, long service life, high brightness, low heat quantity, environmentally friendly, durability, and the like. LEDs are applied quite flexibly and may be made into small thin products in various forms of points, lines, and planes. LEDs have been widely applied to various types of lighting devices, such as a battery-powered flashlight, a mini-sized sound control lamp, a safety flare, illuminating lamps for roadways and indoor stairs, and building and marker continuous lighting lamps.

As the demand of LED (or LED-based lighting devices) is increasing, the production of LED (or LED-based lighting devices) is also increasing. To automate End-of-Line product quality control and process execution of LED (or LED-based lighting devices) production, e.g. checking the execution of required process steps, checking the quality of such executed process steps, computer vision (or machine learning) techniques are being applied. In such techniques, typically visual light-based imaging technologies are used.

US 2004/184031A1 discloses a three-dimensional optical inspection system which reconstructs a three-dimensional image of the shape of the surface of an at least partially specular object resident on a printed circuit board by capturing two or more two-dimensional images of the object under different illumination configurations. The diffuse reflection, as well as the specular reflection can be used to reconstruct the three-dimensional image using any reconstruction method, such as photometric stereo. The different illumination configurations can be achieved using an illumination source including light-emitting elements arranged in concentric circular arrays, in which each of the circular arrays is divided into sections. Each section is independently controlled to selectively activate the sections to illuminate the object in a pre-established illumination pattern.

SUMMARY OF THE INVENTION

The inventors have realized that the use of computer vision techniques in LED assembly process automation has severe limitations in recognizing defects in LED (or in LED-based lighting devices) leading to e.g. wrong or no detection of defects. For example, it becomes very difficult when a white object feature (e.g. a white-painted electronic driver) needs to be recognized and captured versus a white background (a white-painted metal carrier plate). Or as another example, to recognize a quasi-transparent lens plate on top of a printed board and analyze e.g. the alignment of lens plate versus printed board features is very difficult.

It is therefore an object of the present invention to provide a system with an improved recognition of defects in (LED-based) lighting devices during the assembly process, e.g. for the automated tracking of the assembly process of the lighting device.

According to a first aspect, the object is achieved by an inspection system for inspecting a lighting device during an assembly process of the lighting device; wherein the lighting device comprises a base plate and a plurality of components mounted on the base plate; wherein the inspection system comprises: a light source arranged for illuminating the lighting device according to a first light output spectrum for providing a luminance contrast between the base plate and the plurality of components; an imaging unit arranged for capturing a first image of the illuminated lighting device; a controller comprising a processing unit for determining a luminance contrast measure of the captured first image; wherein the processing unit is further arranged for, when the luminance contrast measure of the captured first image exceeds a threshold value, adapting the first light output spectrum, and wherein the imaging unit is further arranged for capturing a second image of the lighting device illuminated according to the adapted first light output spectrum; and wherein the controller further comprises: a comparing unit arranged for comparing the second image with a reference image; a determination unit arranged for determining a defect in the base plate and/or in the plurality of components based on the comparison.

The inspection system comprises a light source for illuminating the lighting device according to a first light output spectrum. The light source may be external to the lighting device. The first light output spectrum may comprise a first wavelength or a first wavelength range. For example, the first light output spectrum may be a blue color with wavelength between approximately 380 nm and 500 nm. The first light output spectrum may be used to provide a luminance contrast between the base plate and the plurality of components. Luminance contrast is the difference in luminance or color that makes an object (or its representation in an image or display, e.g. a base and a plurality of components in an image), distinguishable.

The inspection system further comprises an imaging unit arranged for capturing a first image of the illuminated lighting device. The imaging unit may be a camera. The imaging unit may be a 2D video camera, a stereo video camera, a depth-aware (ranging) video camera (e.g. time-of-flight camera). An imaging unit may comprise one or more imaging devices. The illuminated lighting device may be illuminated with the first light output spectrum.

The inspection system further comprises a controller comprising a processing unit for determining a luminance contrast measure of the captured first image. The Luminance contrast measure may comprise pixels intensity of an image, e.g. the pixel intensity of the base plate and the plurality of components of the lighting device. A pixel is a physical point in an image, or the smallest addressable element in an all points addressable display device; so, it is the smallest controllable element of an image represented on a screen.

For example, pixels in grayscale images may need one byte, e.g. to represent amount of gray intensity, to render the pixel on the screen. The pixels in color images are represented by three values of Red, Green and Blue (r,g,b). The values indicate the intensity of red, green, and blue, respectively, needed to render the pixel on the screen. The luminance contrast measure may comprise be a (abrupt) change of intensity of pixels in an image, for instance, change of intensities of pixels of the plurality of components with respect to the base plate. Additionally, and/or alternatively the luminance contrast measure may comprise one or more of: Weber contrast, Michelson contrast, RMS contrast etc.

The processing unit may be further arranged for, when the luminance contrast measure of the captured first image exceeds a threshold value, adapting the first light output spectrum, thus optimizing the first light output spectrum. The imaging unit may be (then) further arranged for capturing a second image of the lighting device illuminated according to the adapted first light output spectrum. The controller may further comprise: a comparing unit may be arranged for comparing the second image with a reference image; a determination unit may be arranged for determining a defect in the base plate and/or in the plurality of components based on the comparison. Since, the inspection system optimizes the light output spectrum of the light source, and determines defects in the base plate and/or in the plurality of components based on captured images of the lighting device according to the optimized light output, an improved system with an improved recognition of defects in (LED-based) lighting devices during the assembly process is provided. The provided system is not limited to LED-based lighting devices but also provides improved recognition of defects for other lighting devices.

In an embodiment, the comparing unit may be arranged for, when the luminance contrast measure of the captured first image does not exceed the threshold value, comparing the first image with the reference image.

In an example, the luminance contrast measure of the captured first image may already be sufficient for inspecting the base plate and/or the plurality of components. In other words, the first light output spectrum may be optimal for the base plate and/or the plurality of components and, hence, doesn't require to be adapted. For example, the first light output spectrum may be based on expert knowledge. Therefore, in such situations, the anomaly detection may be based on the comparison of the first image with the reference image of the lighting device. The reference image may comprise an image of the lighting device without defects in the base plate and in the plurality of components.

In an embodiment, the processing unit may be arranged for obtaining a signal indicative of optical properties of the base plate and/or the plurality of components; adapting the first light output spectrum based on obtained optical properties.

A signal indicative of optical properties of the base plate and/or the plurality of components may be obtained. The optical properties of a material define how it interacts with light. For each material, e.g. the base plate and/or the plurality of components, the incident radiation is partially transmitted, partially reflected and partially absorbed. Therefore, the optical properties may comprise transmissivity, reflectivity and absorptivity etc. The first light output spectrum may be advantageously adapted based on these optical properties to improve luminance contrast.

In an embodiment, the processing unit may be arranged for adapting the first light output spectrum by sequentially increasing or decreasing the first light output spectrum.

Additionally, or alternatively to adapting the first light output spectrum based on the obtained optical properties, the processing unit may scan all spectrum (wavelengths) sequentially and use a hit and trial method of optimizing the first light output spectrum. The scanning of spectrums may be performed via a feedback loop.

In an embodiment, the lighting device may be unpowered during the assembly process.

During the assembly process, the lighting device does not receive electrical power, e.g. it is unpowered. The plurality of components, e.g. LEDs, mounted on the base plate may be unpowered to illuminate the lighting device. Therefore, a light source which is external to the lighting device may be used to illuminate the lighting device and the first light output spectrum may be optimized to improve the luminance contrast.

In an embodiment, the plurality of components may comprise at least a phosphor coated LED.

The plurality of components may comprise at least a phosphor coated LED. In other examples, the plurality of components may further comprise electronic LED driver(s), screw drivers, wires etc. The LEDs may be coated with phosphor, e.g. to convert blue to mixed white. Although the yellow phosphor provides some contrast between the LED and the base plate but the effect of it is low.

In an embodiment, the first light output spectrum may be a blue light spectrum or a UV light spectrum.

In an example, the first light output spectrum may be a light spectrum that causes the plurality of components to emit light which is detectable for the imaging unit. For example, for phosphor coated LED using a blue light spectrum may provide a detectable image with improved luminance contrast for the anomaly detection. In an other example, UV spectrum may be used to improve luminance contrast for fluorescent components of the plurality of components such as labels, paints and glue material.

In an embodiment, the comparing unit may be arranged for using computer vision and/or machine learning algorithms for image comparison.

Different state-of-the-art computer vision and/or machine learning algorithms may be used for image comparison. For example, Generative adversarial networks GANs may be used as a machine learning algorithm to determine anomaly (defect) in the base plate and/or the plurality of components.

In an embodiment, the threshold value may be determined by the computer vision and/or the machine learning algorithms.

In this advantageous embodiment, the threshold value for the luminance contrast measure may be determined by the computer vision and/or the machine learning algorithms. For example, the threshold value may be determined when a certain accuracy level of the computer vision and/or machine learning algorithms is achieved. Alternatively, the threshold value may be selected by a user.

In an embodiment, the light source may be a multispectral light source arranged for illuminating the lighting device at least according to the first light output spectrum and a second light spectrum; wherein the processing unit may be further arranged for, when a luminance contrast measure of an image of the lighting device illuminated by the multispectral light source exceeds a threshold value; adapting the first light output spectrum and/or the second light spectrum.

In an example, the light source may be a multispectral light source. A multispectral light source is a light source capable of emitting more than one spectral light content. In an alternate example, the light source may comprise a plurality of light sources arranged for emitting multiple spectrums. In an example, the first light output spectrum may provide a background illumination to make the overall plurality of components visible, and the second light output spectrum may provide an increased luminance contrast for one or more of the plurality of components which are not distinguishable with the first light output spectrum. In an example, the first light output spectrum may be a white light and the second light output spectrum may be a UV light spectrum, e.g. to enhance phosphorescence. In another example, the multispectral light source may be arranged for using polarized light.

In an embodiment, the imaging unit may be a multi-spectral sensing device.

A multispectral image is one that captures image data within specific wavelength ranges across the electromagnetic spectrum. A multi-spectral sensing device may be advantageously used to capture a multispectral image of the lighting device.

In an embodiment, wherein the imaging unit may comprise a thermal imaging device arranged for capturing a first thermal image of the illuminated lighting device illuminated according to the first light output spectrum and/or a second thermal image of the illuminated lighting device illuminated according to the adapted first light output spectrum. In an embodiment, wherein the comparing unit may be further arranged for comparing the first or the second thermal image with a reference thermal image; and the determination unit may be further arranged for determining a defect in the base plate and/or in the plurality of components based on the comparison.

The light actuation on the lighting device may result in an increased temperature of at least a plurality of components, e.g. parts that contains phosphor, based on the Stokes shift of that phosphor during the conversion of light. The imaging unit may comprise thermal vision device, e.g. a thermal camera, to capture a first and/or a second thermal image of the lighting device. The first thermal image of the lighting device may be captured when the lighting device is illuminated according to the first light output spectrum and the second thermal image may be captured when the lighting device is illuminated according to the adapted first light output spectrum. These thermal images may be compared with a reference thermal image, wherein the reference thermal image may represent a correct (without defects) thermal distribution of the base plate and/or of the plurality of components, for determining defects in the base plate and/or the plurality of components. This will provide a further improved determination of defects in the lighting device.

According to a second aspect, the object is achieved by a method for inspecting a lighting device during an assembly process of the lighting device; wherein the lighting device comprises a base plate and a plurality of components mounted on the base plate; wherein the method comprises the steps of: illuminating the lighting device according to a first light output spectrum for providing a luminance contrast between the base plate and the plurality of components; capturing a first image of the illuminated lighting device; determining a luminance contrast measure of the captured first image; and wherein when the luminance contrast measure of the captured first image exceeds a threshold value; adapting the first light output spectrum; and capturing a second image of the lighting device illuminated according to the adapted first light output spectrum; wherein the method further comprises: comparing the second image with a reference image; determining a defect in the base plate and/or in the plurality of components based on the comparison.

According to a third aspect, the object is achieved by a controller for inspecting a lighting device during an assembly process of the lighting device; wherein the controller comprises: an input interface and an output interface; a processing unit arranged for determining a luminance contrast measure of a first image of the lighting device illuminated according to a first light output spectrum; and wherein the processing unit is further arranged for, when the luminance contrast measure of the first image exceeds a threshold value, adapting the first light output spectrum, a comparing unit arranged for comparing the first or a second image of the lighting device illuminated according to the adapted first light output spectrum with a reference image; a determination unit arranged for determining a defect in a base plate and/or in a plurality of components of the lighting device based on the comparison.

According to a fourth aspect, the object is achieved by a computer program product comprising instructions which, when the program is executed by a computer, cause the computer to carry out the steps of the method of the second aspect.

It should be understood that the computer program product and the method may have similar and/or identical embodiments and advantages as the above-mentioned systems.

BRIEF DESCRIPTION OF THE DRAWINGS

The above, as well as additional objects, features and advantages of the disclosed systems, devices, and methods will be better understood through the following illustrative and non-limiting detailed description of embodiments of systems, devices, and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
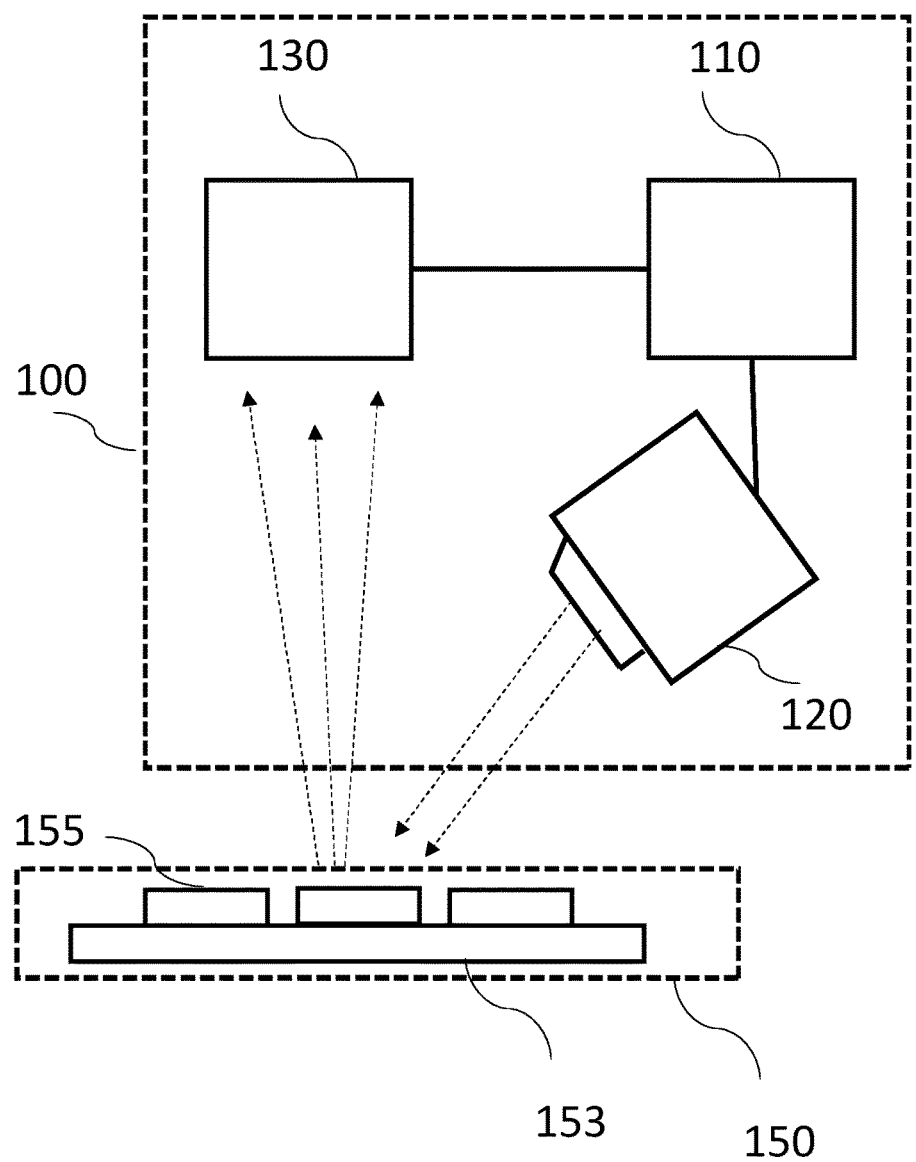
FIG. 1 shows schematically and exemplary an embodiment of an inspection system for inspecting a lighting device during an assembly process of the lighting device.

FIG. 1 shows schematically and exemplary an embodiment of an inspection system 100 for inspecting a lighting device 150 during an assembly process of the lighting device 150. The lighting device 150 may comprise a base plate 153 and a plurality of components 155 mounted on the base plate 153. During the assembly process, the lighting device 150 may be electrically unpowered, e.g. it does not receive electrical power. FIG. 1 shows a side view of the lighting device 150. The base plate 153 may comprise a metallic, a plastic or a polymer plate. A lighting device 150 is a device or structure arranged to emit light suitable for illuminating an environment, providing or substantially contributing to the illumination on a scale adequate for that purpose. A lighting device 150 may comprise at least one light source or lamp, such as an LED-based lamp, gas-discharge lamp or filament bulb, etc., optionally any associated support, casing or other such housing. For example, the plurality of components 155 may comprise, LED sources, LED drivers, screws, wires, labels, glue materials, paints, etc.

Each of the lighting device 150 may take any of a variety of forms, e.g. a ceiling mounted luminaire, a wall-mounted luminaire, a wall washer, or a free-standing luminaire (and the luminaires need not necessarily all be of the same type).

The inspection system 100 may comprise a light source(s) 120 arranged for illuminating the lighting device 150 according to a first light output spectrum for providing a luminance contrast between the base plate 153 and the plurality of components 155. The light source 120 may a separate lighting device, external to the lighting device 150. The light source 120 may comprise an LED-based lamp, gas-discharge lamp or filament bulb, etc., optionally with any associated support, casing or other such housing and may take any form. In this exemplary figure, only one light source 120 is shown. One or more light sources 120 may be used in the inspection system 100. The light source 120 may be a multispectral light source arranged for illuminating the lighting device according to a first light output spectrum and a second light spectrum. Alternative to using a multispectral light source, a plurality of light sources may be used to emit the first light output spectrum and the second light spectrum.

The inspection system 100 may further comprise an imaging unit 130 arranged for capturing a first image of the illuminated lighting device 150 illuminated according to the first light output spectrum. The first image is a static image of the illuminated lighting device 150. The imaging unit 130 may be a camera. The imaging unit may be a 2D video camera, a stereo video camera, a depth-aware (ranging) video camera (e.g. time-of-flight camera). The use of any imaging device known in the art is not excluded. In the exemplary figure, an imaging unit 130 may comprise one imaging device. An imaging unit 130 may comprise one or more imaging devices; wherein the first image of the illuminated lighting device 150, for instance, may be a combination of multiple images from the plurality of imaging devices, e.g. by performing compositing. The imaging unit 130 may comprise a multi-spectral sensing device. The imaging unit 130 may comprise a thermal imaging device arranged for capturing a first thermal image of the illuminated lighting device illuminated according to the first light output spectrum and/or a second thermal image of the illuminated lighting device illuminated according to the adapted first light output spectrum.

The inspection system 100 may further comprise a controller 110. The controller 110 may comprise a processing unit (not shown) for determining a luminance contrast measure of the captured first image. The luminance contrast measure may comprise different measures representing luminance contrast of an image. One or more luminance contrast measure(s) may be used. In an example, the luminance contrast measure may be pixels intensity or a variation in the pixel intensity. For example, the luminance contrast measure may be the variation in pixel intensity of the plurality of components 155 and the base plate 153. The variation in pixel intensity may be for the one or more components in the plurality of components. The variation may be an abrupt or expected change in intensities. In another example, the luminance contrast measure may comprise one or more of: Weber contrast, Michelson contrast, RMS contrast, contrast sensitivity function etc. The RMS contrast is related to a change in intensities and defined as the standard deviation of the pixel intensities. Any other measure for luminance contrast known in the art may also be used.

The processing unit may be further arranged for, when the luminance contrast measure of the captured first image exceeds a threshold value, adapting the first light output spectrum. The processing unit may be arranged for obtaining a signal indicative of optical properties of the base plate 153 and/or the plurality of components 155. The adaption of the first light output spectrum may be based on the obtained optical properties. The optical properties may comprise one or more of: refraction, polarization, reflection, absorption, photoluminescence (fluorescence), transmittance, diffraction, dispersion, dichroism, scattering, birefringence, color, photosensitivity etc. For example, the blue light spectrum or UV light may be used for the base plate/plurality of components with phosphorous or fluorescent compounds. Additionally, and/or alternatively, the processing unit may be arranged for adapting the first light output spectrum by sequentially increasing or decreasing the first light output spectrum. For example, by scanning different spectrum, an optimal for the base plate 153/plurality of components 155 may be achieved. The scanning of spectrums may be inputted to a computer vision/machine learning algorithm(s), with the purpose to define the optimal one or more wavelengths which may provide feature recognition. The scanning and optimizing may be referred to as an auto-calibration that can be repeated for each new lighting device or for each new environmental condition change, such as e.g. in another factory. In an example, different spectrums may be used to determine defect in different one or more components of the plurality of components 155 or in the base plate 153.

The imaging unit 130 may be (then) further arranged for capturing a second image of the lighting device 150 illuminated according to the adapted first light output spectrum. The controller 110 may control the light source 120 to illuminate according to the adapted first light output spectrum. The controller 110 may then trigger the imaging unit 130 to capture the second image of the lighting device 150.

The controller 110 may further comprise a comparing unit (not shown) which may be arranged for comparing the second image with a reference image. The comparing unit may be arranged for using computer vision and/or machine learning algorithms for image comparison. For instance, the comparing unit may use pattern recognition algorithms, e.g. classification algorithms such as linear discriminant analysis, quadratic discriminant analysis etc., clustering algorithms such as k-mean clustering, correlation clustering etc., generative adversarial networks (GANs), template matching etc. The use of other computer vision and/or machine learning algorithms known in the art for detecting anomalies are not excluded. In an example, the threshold value may be determined by the computer vision and/or the machine learning algorithms, e.g. to make sure that the determination of defects is performed optimally. The controller 110 further comprises a determination unit (not shown) arranged for determining a defect in the base plate and/or in the plurality of components based on the comparison. A defect may comprise one or more of absence, misplacement, misalignment, damage etc. of the base plate 153 and/or of one or more of the plurality of components 155. The determination unit may be further arranged for determining a stage of the manufacturing process by comparing the second/first captured image with multiple reference images each for a different stage of the process. The comparing unit may be further arranged for comparing the first or the second thermal image with a reference thermal image; and the determination unit may be further arranged for determining a defect in the base plate 153 and/or in the plurality of components 155 based on the (thermal image) comparison.

The inspection system 100 may comprise one of more separate devices distributed in space, e.g. light source 120, imaging unit 130 etc. Alternatively, the inspection system 100 may be comprised in a single device such that the light source 120, imaging unit 130 etc. are units in the single device. Further, the inspection system 100 may be partially comprised in a device, e.g. the light source 120 and the imaging unit 130 may be comprised in a single device and wherein the controller 110 may be comprised in a device external/separate to the light source 120/imaging unit 130.

Figure 2:
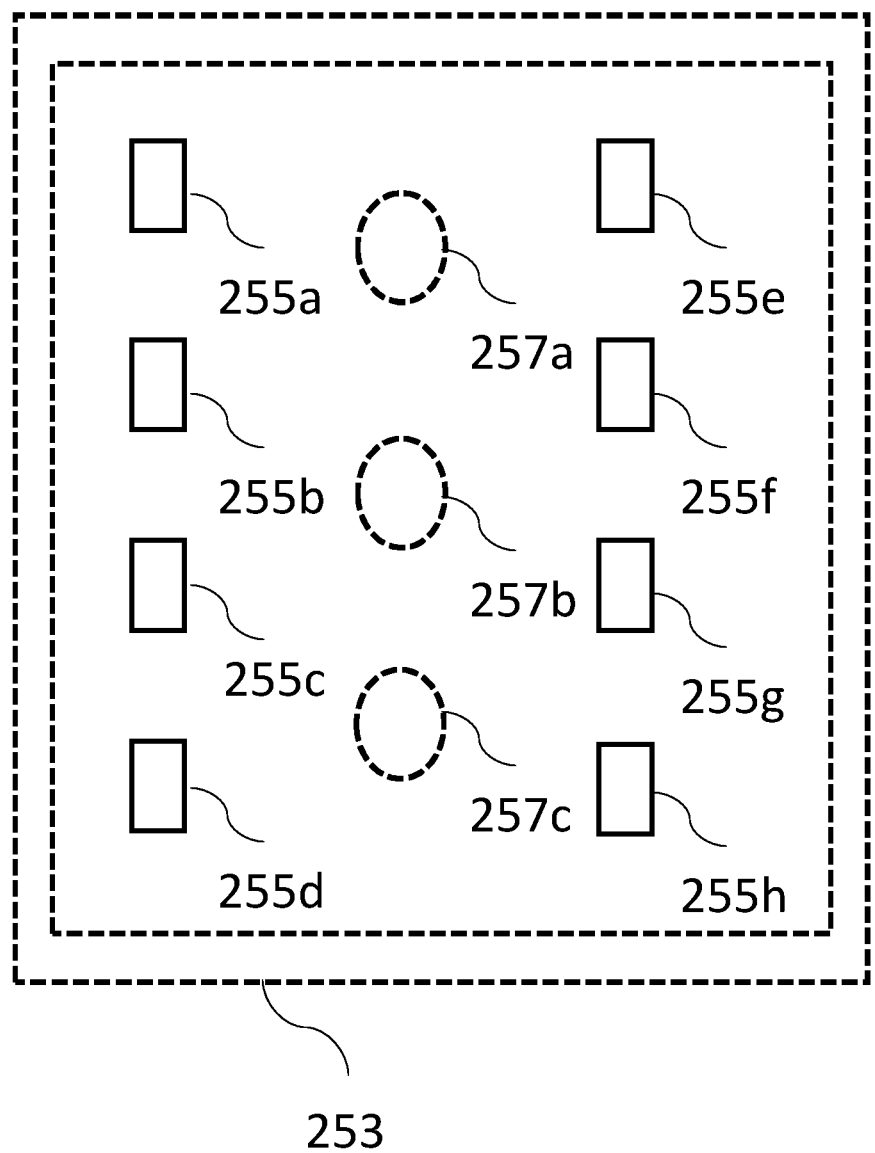
FIG. 2 shows schematically and exemplary an embodiment of a lighting device.

FIG. 2 shows schematically and exemplary an embodiment of a lighting device 250. The lighting device 250 may comprise a base plate 253. The lighting device 250 may further comprise a plurality of components 255a-h, 257a-c mounted on the base plate 253. In this exemplary figure, the plurality of components 255a-h, 257a-c comprises a plurality of LED sources 255a-h and a plurality of screws 257a-c. The plurality of components 255a-h, 257a-c may further comprise wires (not shown), LED drivers, capacitors (not shown), resistors (not shown) etc. The interior of a lighting device 250, and its parts (e.g. the base plate 253 and/or the plurality of components 255a-h, 257a-c) that are in the optical pathway, may be often finished in such a way that the optical efficiency is maximized. This means often that the parts are made white in color (unless these parts would be optical components such as mirrors (specular metal) or forming optics (such as transparent lenses).

Figure 3:
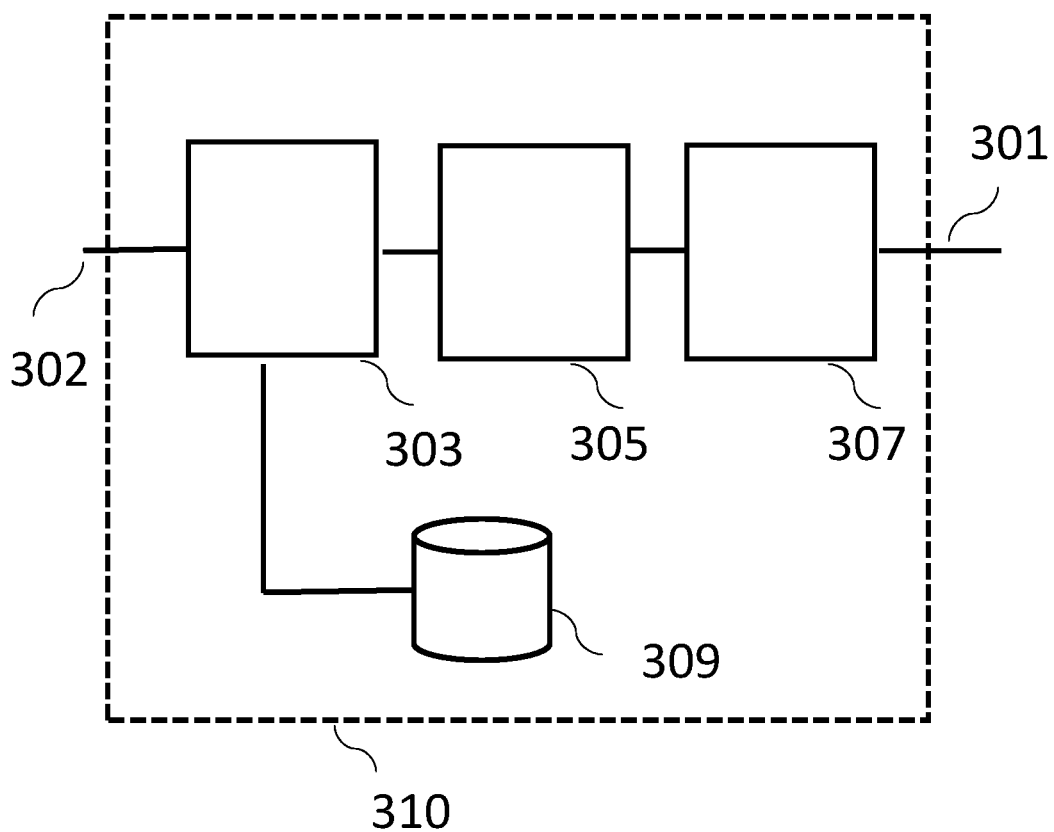
FIG. 3 shows schematically and exemplary an embodiment of a controller for inspecting a lighting device during an assembly process of the lighting device.

FIG. 3 shows schematically and exemplary an embodiment of a controller 310 for inspecting a lighting device 150, 250 during an assembly process of the lighting device 150, 250. The controller 310 may comprise an input interface 301. The input interface 301 may be arranged for obtaining a signal indicative of optical properties of the base plate 153, 253 and/or the plurality of components 155, 255a-h, 257a-c. The signal may be received from an external network such as from cloud or may be stored in the memory 309 of the controller 310. The controller 310 may further comprise an output interface 302. The output interface 302 may be arranged for outputting a first control signal to the light source 120 related to emitting the (adapted) first light output spectrum and/or a second control signal to the imaging unit 130 related to capturing the first and/or the second image of the lighting device 150, 250. The controller 310 may further comprise a processing unit 303 arranged for determining a luminance contrast measure of the captured first image, wherein the processing unit 303 may be further arranged for, when the luminance contrast measure of the captured first image exceeds a threshold value, adapting the first light output spectrum. The processing unit 303 may be further arranged for controlling the light source 120 to illuminate the adapted first light output spectrum. The processing unit 303 may be further arranged for controlling the imaging unit 130 to capture a second image of the lighting device 150, 250 illuminated according to the adapted first light output spectrum. Additionally, and/or alternatively, the imaging unit 130 has a sensing device (not shown) to determine when the light output of the light source 120 has been changed and then capture the second image of the lighting device 150, 250.

The controller 130 may further comprise a comparing unit 305 which may be arranged for comparing the second image with a reference image. The comparing unit 305 may use computer vision and/or machine learning algorithms. The controller 130 may further comprise a determination unit 307 arranged for determining a defect in the base plate 153, 253 and/or in the plurality of components 155, 255a-h, 257a-c, based on the comparison.

The controller 310 may further comprise a memory 309 arranged for storing, for instance, the first light output spectrum, the adapted first light output spectrum, luminance contrast measure of the captured first image, the threshold value, the computer vision and/or machine learning algorithms, optical properties of the base plate 153,253 and/or the plurality of components 155, 255a-h, 257a-c, historical data, libraries of components types, look up tables etc. The memory 309 may comprise one or more suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

The controller 310 may be implemented in a unit separate from the light source 120 and/or imaging unit 130, such as wall panel, desktop computer terminal, or even a portable terminal such as a laptop, tablet or smartphone. Alternatively, the controller 310 may be incorporated into the same unit as the light source 120 and/or imaging unit 130. Further, the controller 310 may be implemented remotely (e.g. on a server at a different geographical site); and the controller 310 may be implemented in a single unit or in the form of distributed functionality distributed amongst multiple separate units (e.g. a distributed server comprising multiple server units at one or more geographical sites, or a distributed control function distributed amongst the light source 120 and imaging unit 130). Furthermore, the controller 310 may be implemented in the form of software stored on a memory (comprising one or more memory devices) and arranged for execution on a processor (comprising one or more processing units), or the controller 310 may be implemented in the form of dedicated hardware circuitry, or configurable or reconfigurable circuitry such as a PGA or FPGA, or any combination of these.

Regarding the various communication involved in implementing the functionality, e.g. to enable the controller 310 to obtain, for instance the optical properties of the base plate 153 and/or the plurality of components 155, 255a-h, 157a-c, or to control the light output of the light source 120, these may be implemented in by any suitable wired and/or wireless means, e.g. by means of a wired network such as an Ethernet network, a DMX network or the Internet; or a wireless network such as a local (short range) RF network, e.g. a Wi-Fi, ZigBee or Bluetooth network; or any combination of these and/or other means.

Figure 4:
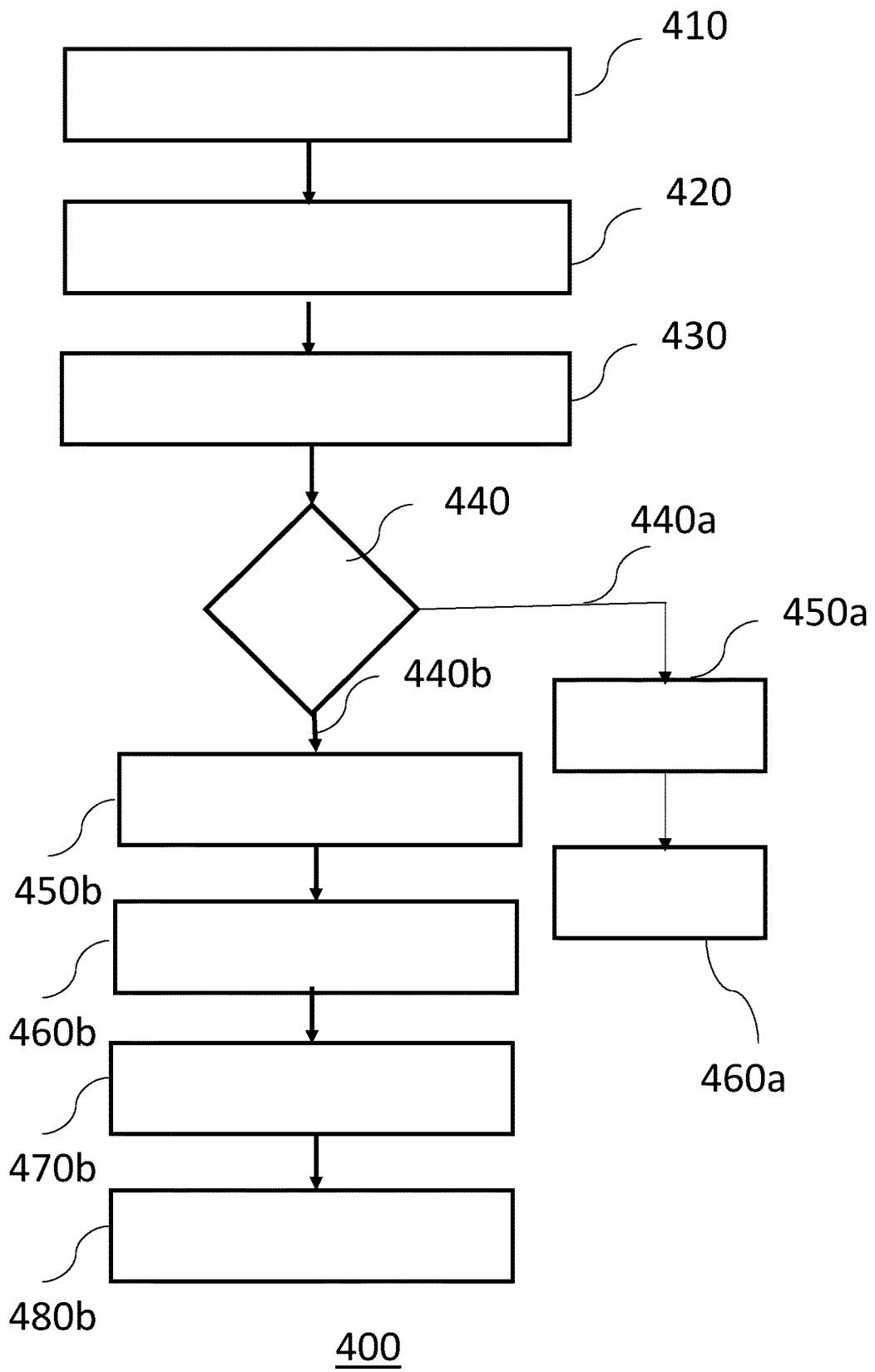
FIG. 4 shows schematically and exemplary a flowchart illustrating an embodiment of a method for inspecting a lighting device during an assembly process of the lighting device.

FIG. 4 shows schematically and exemplary a flowchart illustrating an embodiment of a method 400 for inspecting a lighting device 150 during an assembly process of the lighting device 150. The method 400 may comprise the step of illuminating 410 the lighting device 150 according to a first light output spectrum for providing a luminance contrast between the base plate 153 and the plurality of components 155, 255a-h, 257a-c. A controller 110 may be used to control the illumination of the light source 120. The method 400 may further comprise capturing 420 a first image of the illuminated lighting device 150. An imaging unit 130, e.g. a camera, may be arranged for capturing the first image. The first image may be a static image.

The method 400 may comprise determining 430 a luminance contrast measure of the captured first image. The controller 110 may be arranged for determining 430 whether the luminance contrast measure of the captured first image exceeds a threshold value. If the luminance contrast measure exceeds the threshold value 440b, the method 400 may comprise adapting 450b the first light output spectrum. The controller 110 may be arranged for adapting 450b the first light output spectrum. Adaption 450b may be performed based on the optical properties of the base plate 153 and/or the plurality of components 155, 255a-h, 257a-c and/or based on a scanning of different spectrums. In an example, the first light output spectrum is adapted for the one or more components of the plurality of components 155, 255a-h, 257a-c. In other words, different spectrums may be suitable for different components. In such case, different (suitable) spectrums may be used.

The method 400 may further comprise capturing 460b a second image of the lighting device 150 illuminated according the adapted first light output spectrum. The second image may be captured by the imaging unit 130. The method may then further comprise comparing 470b the second image with a reference image. The reference image comprises an image of the lighting device without any defect(s). The comparing 470b may comprise using computer vision and/or machine learning algorithms. The method 400 may further comprise determining 480b a defect in the base plate 153 and/or in the plurality of components 155, 255a-h, 257a-c based on the comparison.

When the luminance contrast measure of the captured first image does not exceed 440a the threshold value, the method 400 may then comprise comparing 450a the first image with the reference image and then determining 460a a defect in the base plate 153, 253 and/or in the plurality of components 155, 255a-h, 257a-c based on the comparison.

The method 400 may be executed by computer program code of a computer program product when the computer program product is run on a processing unit of a computing device, such as the processing unit 303 of the controller 110.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. An inspection system for inspecting a lighting device during an assembly process of the lighting device, the lighting device having a base plate and a plurality of components mounted on the base plate, the inspection system comprises:
   a light source arranged for illuminating the lighting device according to a first light output spectrum for providing a luminance contrast between the base plate and the plurality of components;
   an imaging unit arranged for capturing a first image of the illuminated lighting device;
   a controller comprising a processing unit for determining a luminance contrast measure of the captured first image, the processing unit further configured to adapt the first light output spectrum when the luminance contrast measure of the captured first image exceeds a threshold value, and the imaging unit further arranged for capturing a second image of the lighting device illuminated according to the adapted first light output spectrum,
   the controller further comprising
   a comparing unit arranged for comparing the second image with a reference image; and
   a determination unit arranged for determining a defect in the base plate and/or in the plurality of components based on the comparison.

2. The inspection system according to claim 1; wherein the comparing unit is arranged for, when the luminance contrast measure of the captured first image does not exceed the threshold value, comparing the first image with the reference image.

3. The inspection system according to claim 1; wherein the processing unit is arranged for:
   obtaining a signal indicative of optical properties of the base plate and/or the plurality of components;
   adapting the first light output spectrum based on obtained optical properties.

4. The inspection system according to claim 1; wherein the processing unit is arranged for adapting the first light output spectrum by sequentially increasing or decreasing the first light output spectrum.

5. The inspection system according to claim 1; wherein the lighting device is unpowered during the assembly process.

6. The inspection system according to claim 1; wherein the plurality of components comprises at least a phosphor coated LED.

7. The inspection system according to claim 1; wherein the comparing unit is arranged for using computer vision and/or machine learning algorithms for image comparison.

8. The inspection system according to claim 7; wherein the threshold value is determined by the computer vision and/or the machine learning algorithms.

9. The inspection system according to claim 1; wherein the light source is a multispectral light source arranged for illuminating the lighting device at least according to the first light output spectrum and a second light spectrum; wherein the processing unit is further arranged for, when a luminance contrast measure of an image of the lighting device illuminated by the multispectral light source exceeds a threshold value; adapting the first light output spectrum and/or the second light spectrum.

10. The inspection system according to claim 9; wherein the imaging unit is a multi-spectral sensing device.

11. The inspection system according to claim 1; wherein the imaging unit comprises a thermal imaging device arranged for capturing a first thermal image of the illuminated lighting device illuminated according to the first light output spectrum and/or a second thermal image of the illuminated lighting device illuminated according to the adapted first light output spectrum.

12. The inspection system according to claim 11; wherein the comparing unit is further arranged for comparing the first or the second thermal image with a reference thermal image; and the determination unit is further arranged for determining a defect in the base plate and/or in the plurality of components based on the comparison.

13. A controller for inspecting a lighting device during an assembly process of the lighting device with the inspection system according to claim 1; wherein the controller comprises:
   an input interface and an output interface;
   a processing unit arranged for determining a luminance contrast measure of a first image of the lighting device illuminated according to a first light output spectrum; and wherein the processing unit is further arranged for, when the luminance contrast measure of the captured first image exceeds a threshold value, adapting the first light output spectrum,
   a comparing unit arranged for comparing the first or a second image of the lighting device illuminated according to the adapted first light output spectrum with a reference image;
   a determination unit arranged for determining a defect in a base plate and/or in a plurality of components of the lighting device based on the comparison.

14. A method for inspecting a lighting device during an assembly process of the lighting device with the inspection system according to claim 1; wherein the lighting device comprises a base plate and a plurality of components mounted on the base plate;
   wherein the method comprises the steps of:
      illuminating the lighting device according to a first light output spectrum for providing a luminance contrast between the base plate and the plurality of components;
      capturing a first image of the illuminated lighting device;
      determining a luminance contrast measure of the captured first image;
      adapting the first light output spectrum when the luminance contrast measure of the captured first image exceeds a threshold value;
      capturing a second image of the lighting device illuminated according to the adapted first light output spectrum;
      comparing the second image with a reference image; and
      determining a defect in the base plate and/or in the plurality of components based on the comparison.

15. A non-transitory computer-readable medium on which are stored a plurality of non-transitory computer-readable instructions that when executed on a processor are configured to perform the steps comprising the method as defined in claim 14.

* * * * *